(12) United States Patent
Purpus et al.

(10) Patent No.: US 6,317,059 B1
(45) Date of Patent: Nov. 13, 2001

(54) METHOD AND APPARATUS FOR DISPLAY OF FLIGHT GUIDANCE INFORMATION

(75) Inventors: Matthias Purpus, Darmstadt; Harro von Viebahn, Grosse-Bieberau, both of (DE)

(73) Assignee: VDO Luftfahrtgeraete Werk GmbH, Frankfurt am Main (DE)

(*) Notice: Subject to any disclaimer, the term of this patent is extended or adjusted under 35 U.S.C. 154(b) by 0 days.

(21) Appl. No.: 09/171,085

(22) Filed: Oct. 13, 1998

Related U.S. Application Data

(63) Continuation of application No. PCT/DE97/00747, filed on Apr. 11, 1997.

(30) Foreign Application Priority Data

Apr. 15, 1996 (DE) .............................................. 196 14 801

(51) Int. Cl.⁷ .................................................. G01C 21/00
(52) U.S. Cl. ......................... 340/974; 340/973; 340/975
(58) Field of Search ..................... 340/972, 973, 340/971, 974, 975, 976

(56) References Cited

U.S. PATENT DOCUMENTS

| | | | |
|---|---|---|---|
| 3,784,969 | * 1/1974 | Wilckens et al. | 340/972 |
| 5,289,185 | * 2/1994 | Ramier et al. | 340/974 |
| 5,420,582 | * 5/1995 | Kubbat et al. | 340/975 |
| 5,798,713 | * 8/1998 | Viebahn et al. | 340/975 |

* cited by examiner

Primary Examiner—Brent A. Swarthout
(74) Attorney, Agent, or Firm—Milde, Hoffberg & MacKlin, LLP

(57) ABSTRACT

A process and system are disclosed for representing flight guiding information for an aircraft. A spatial representation of the air space with at least one horizon and the previously calculated flight path of the aircraft is represented by means of video equipment. The representation of the previously calculated flight path includes the previously calculated position and previously calculated attitude of the aircraft at different moments in time. The previously calculated flight path is represented by at least two bodies which extend along the flight path and of which at least one is represented to the left of the flight path and at least one is represented to the right of the flight path.

11 Claims, 3 Drawing Sheets

METHOD AND APPARATUS FOR DISPLAY OF FLIGHT GUIDANCE INFORMATION

This application is a continuation of the PCT/DE97/00747, filed Apr. 11, 1997.

BACKGROUND OF THE INVENTION

1. Technical field

This invention relates to a method and a device for displaying flight guidance information of an aircraft, wherein a spatial display of the airspace, comprising at least one horizon and the precalculated flight path of the aircraft, is effected by means of an image reproduction device, and wherein the display of the precalculated flight path comprises the precalculated position and the precalculated attitude of the aircraft at different times.

2. Prior art

A method such as this has become known through the published German Patent Application No. DE 39 30 862 to which U.S. Pat. No. 5,420,582 corresponds. This constitutes an improvement on the process of communicating information by an image perceived through natural habits of observation, so that the mental load on the pilot is also reduced. Moreover, the symbolism used constitutes an integral item of information, which makes it possible to monitor the attitude and movement in space and to adhere to flight path specifications and short-term navigation. Due to the manner of display, the qualitative items of information appear in the foreground and are supplemented by the requisite quantitative indications. The task of the pilot is made easier by a summary of the individual items of information which are relevant to the flying phase in an overall image which is fashioned in an ergonomically favorable manner.

In addition, this known method makes it possible to control the aircraft with regard to future situations, wherein the consequences of a control input can be identified directly. Any unwanted developments—for example stalling on take-off—can be identified in good time and can be prevented before they actually occur.

In this known method, the precalculated (predicted) flight path is preferably formed by a plurality of symbols which are each in the form of a triangular plate of finite thickness. Symbols in this form enable the attitude and direction of the aircraft at the respective times to be identified in a particularly simple manner, but necessitate an arrangement of the symbols considerably below the eye level of the pilot in order to provide a favorable direction of view on to the symbols. Because of this, the view is firstly limited to the ground which is also displayed, and secondly, at low flying heights, the predicted flight path is displayed below the level of the ground.

SUMMARY OF THE INVENTION

The principal object of the present invention is to further develop this known method so as to make possible the spatial identification of the symbols, while at the same time providing a view of the displayed ground which is as unobstructed as possible, and with a realistic impression of the altitude in the display of the flight path.

This object, as well as other objects which will become apparent in the discussion that follows, are achieved, in the method according to the present invention in that the display of the precalculated flight path is effected by at least one body on the left of the flight path and by at least one body on the right of the flight path, which bodies extend along the flight path.

In the method according to the invention, a spatial display can be either a perspective display on a flat image reproduction device (screen) or can be a stereoscopic display produced by methods known in the art. Statements of the shape and size of the displays refer to the proportions in reality, and in the case of directional data (left, right) are to be understood as being in the direction of flight.

The length of the bodies may correspond to that distance which the aircraft covers in a few seconds—for example in five seconds. The length of the bodies thus depends on the flying speed.

In advantageous embodiments of the method according to the invention, the spacing of the bodies from each other approximately corresponds to the wing span of the aircraft, and an upper edge of the body is situated approximately at the eye level of the pilot and a lower edge is situated approximately at the height of the bottom point of the extended landing gear.

In these embodiments, a reference to reality is firstly maintained, which makes it easier for the pilot to process the information from what he sees on the screen. Secondly, the displays which are effected according to these embodiments are still readily spatially identifiable as regards their location and size at the given distance of observation and at the resolution of the image reproduction device, without masking too much area of the ground.

To achieve a further improvement of the spatial impression, according to another advantageous embodiment provision can be made for a further body which extends along the flight path to be displayed above the bodies which are displayed on the left and right of the flight path in each case.

In an advantageous manner, it is possible to make a distinction from other objects displayed on the screen by providing the bodies with a cross-section in the shape of a right-angled triangle or with an L-shaped cross-section.

For better identification of the length of the displayed bodies, or of their depth as seen in the direction of view, provision can be made for the bodies to be subdivided in the longitudinal direction into a plurality of component bodies. These component bodies can be straight, for example, and can be aligned according to the portion of the precalculated flight path near which they are displayed.

This further development can be fashioned in such a way that the subdivision is visible due to the design of the component bodies or due to the color the component bodies, where the color of each component body is preferably continuous in the longitudinal direction.

When the bodies are subdivided into component bodies, different flying speeds can be communicated to the pilot by providing spacings between the component bodies which become larger with increasing flying speed, or by causing the length of the bodies and/or of the component bodies to increase as the flying speed increases.

One further development of the invention consists of calculating the position and location of the component bodies according to the precalculated flight path, with the first component bodies in each case being aligned according to the heading and the following component bodies being aligned according to the course over the ground.

To provide a visible indication of a warning, provision can be made in the method according to the invention for at least one color change of at least one body or component body to occur when the aircraft approaches a critical situation. A further color change can be made when the aircraft has reached a critical situation.

Suitable computers, image reproduction devices and sensors are available for carrying out the method, such as those which are described in the aforementioned German Patent Application No. 39 30 862 for example.

An advantageous device for displaying flight information of an aircraft, wherein a spatial display of the airspace comprising at least one horizon and the precalculated flight path of the aircraft is effected with the aid of an image reproduction device, and wherein the display of the precalculated flight path comprises the precalculated position and the precalculated location of the aircraft at various times, is characterized in that the display of the precalculated flight path is effected by at least one body on the left of the flight path and by at least one body on the right of the flight path, which bodies extend along the flight path.

In particular, the device according to the invention can be constructed so that a further body which extends along the flight path is displayed above the bodies which are displayed on the left and right of the flight path in each case.

BRIEF DESCRIPTION OF DRAWINGS

Examples of embodiments of the invention are illustrated in the drawings, which comprise a plurality of Figures, and are explained in more detail in the following description.

DESCRIPTION OF THE PREFERRED EMBODIMENTS

Ways of Carrying Out the Invention

Figure 1:
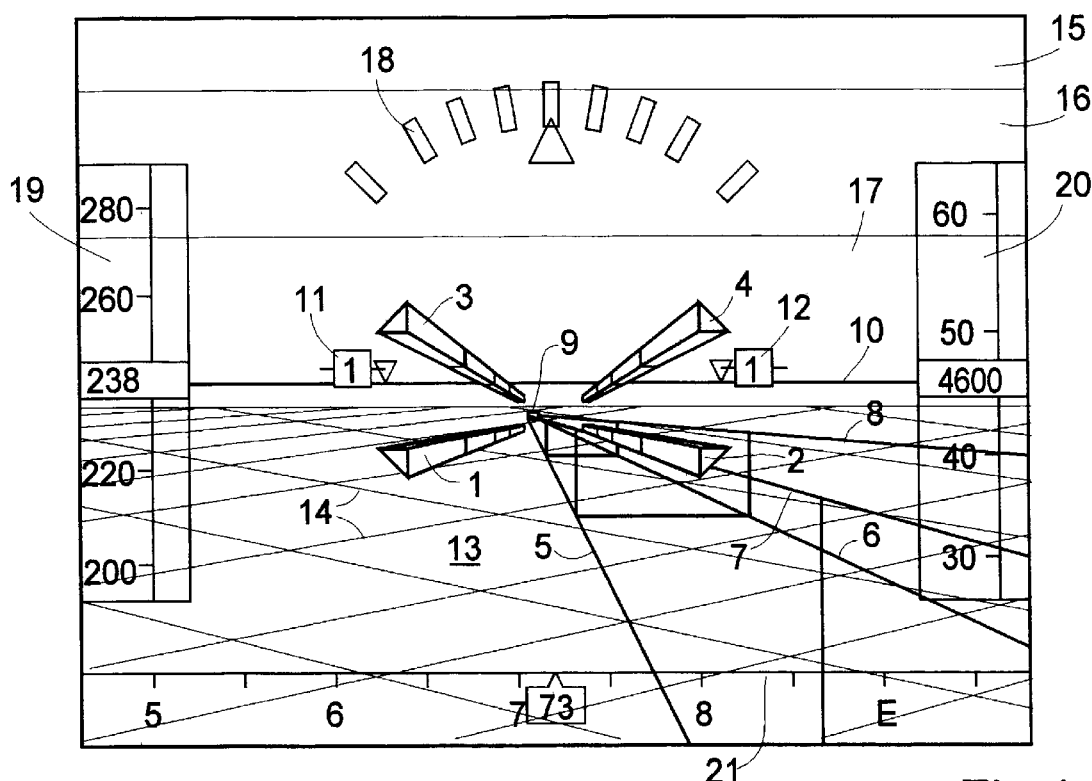
FIG. 1 illustrates a screen on which, in addition to other information, a display is effected of the precalculated flight path by the method according to the invention.

The flight situation shown on the screen in FIG. 1 corresponds to the approach to a landing, wherein the precalculated (predicted) flight path is displayed with the aid of four bodies 1, 2, 3, 4 and straight lines 5, 6, 7, 8 as boundaries of an approach channel which the aircraft is approaching. On flying further in a straight line, the aircraft would touch down near the landing strip which is simply displayed as a rectangle 9.

A line 10 represents the horizon, wherein rectangles 11, 12 indicate the pitch angle by their distance from the horizon 10 and by the figures which are visible inside the rectangles. The ground 13 is provided with a grid 14 which is aligned in a north-south direction. The sky is displayed in the form of strips 15, 16, 17 of different hue (not visible in FIG. 1, but of darker and lighter blue) in order to provide further information on the pitch angle. The ground 13 is preferably displayed in green or brown. Colors and brightness values which differ both from the sky and from the ground are provided for bodies 1 to 4, which are hereinafter also termed predictors.

The other displays which are visible on the screen shown in FIG. 1, particularly a roll angle display 18, a speed display 19, an altitude display 20 and a course display 21, are known in the art and do not need to be explained in more detail in order to provide an understanding of the present invention.

Figure 2:
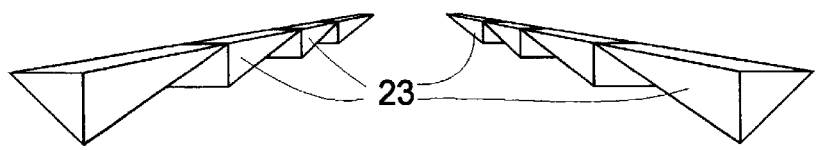
FIGS. 2 to 5 are illustrations of the precalculated flight path which are obtained with the aid of bodies of different forms.
Figure 3:
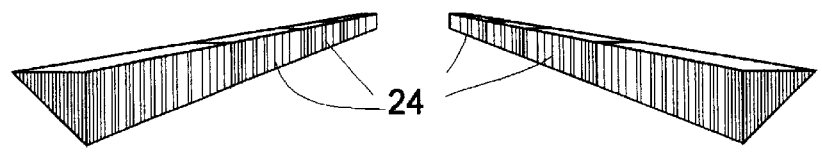

The predictor which is illustrated in FIG. 1 comprises bodies 1 to 4 which are subdivided into a plurality of component bodies. However, a subdivision comprising individual lines, such as that which has been effected for the display in FIG. 1, is not clearly visible due to the limits of resolution of the image reproduction arrangement and of the human eye at the given distance of observation; this is the situation in particular for the component bodies which are at the greatest distance. In one advantageous embodiment of the method according to the invention, the subdivision into component bodies is therefore effected by their design or by a color progression. An example of one form of the component bodies 23 is illustrated in FIG. 2, while a color progression of the component bodies 24 is illustrated in FIG. 3 by a variable density of hatching.

Figure 4:
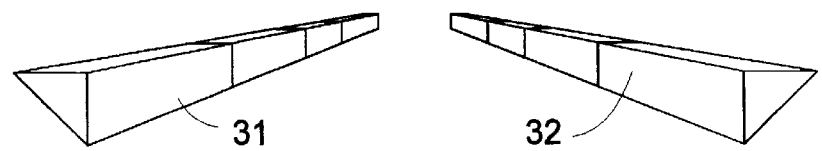
Figure 5:
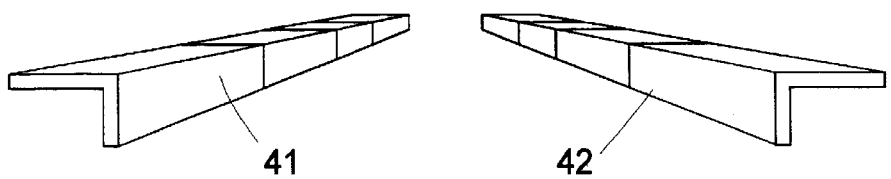

FIGS. 4 and 5 each show a predictor comprising two bodies 31, 32 and 33, 34, respectively, with different cross-sections. For the cross-section shown in FIG. 5, the vertical limb in each case forms the landing gear for instance, while the horizontal limbs symbolize the wings.

Figure 6:
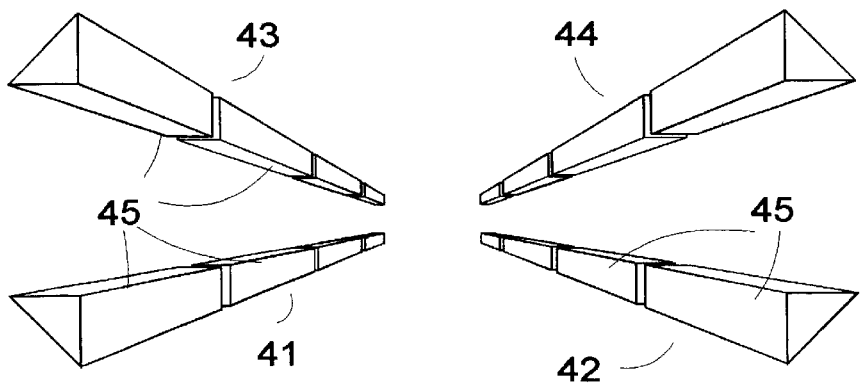
FIG. 6 is a display of the precalculated flight path which is obtained with the aid of four bodies, wherein the component bodies are each spaced apart from each other.
Figure 7:
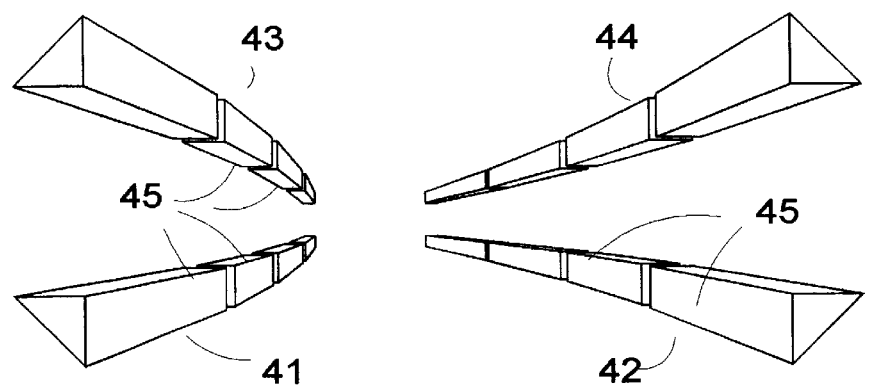
FIG. 7 is a display of a curved precalculated flight path.

FIG. 6 shows a predictor comprising four bodies 41 to 44, which each comprise component bodies 45 which are at a spacing from each other. FIG. 7 illustrates the same predictor when flying in a curve.

Figure 8:
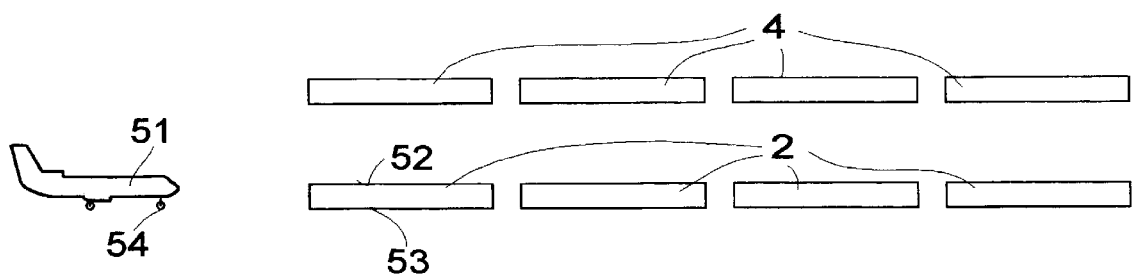
FIG. 8 is a side view of an aircraft and of the bodies transformed into reality.

In the side view of an aircraft 51 and of the bodies 2, 4 which are transformed into reality which is illustrated in FIG. 8, the height of the body 2, and the height of the body 1 on the left side of the flight path, which body is not visible in FIG. 8, are selected so that the upper edge 52 is situated approximately at the eye level of the pilot, while the lower edge assumes the height of the contact surface of the wheel 54, which corresponds to the ground 13 in FIG. 1.

There has thus been shown and described a novel method and apparatus for display of flight guidance information which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Figure 9:
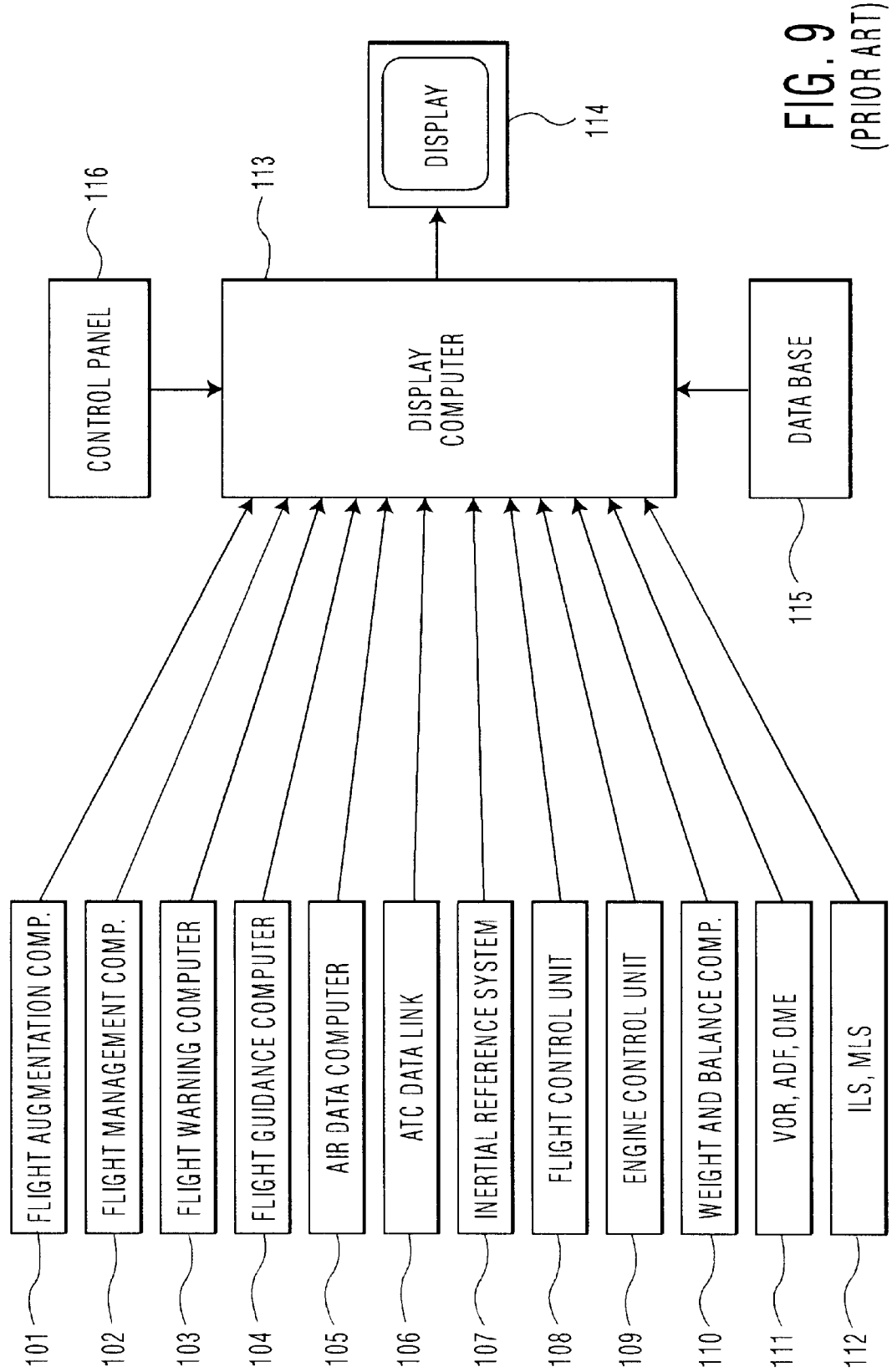
FIG. 9 is a block diagram of a known information and monitoring system which is suitable for practicing the present invention.

In the block diagram of FIG. 9, units 101 to 102 are computer and control apparatus, know per se in commercial aircraft, which transmit information to the display computer 113 for carrying out the method of the invention.

A monitor 114, memory 115, and control panel 116 are connected to the display computer 113. From the information fed from units 101 to 112, the display computer 113 computes data on the development of the flight path. Together with other data including the wing span of the aircrat, the data are then processed into symbols, which are connected into video signals and fed to the monitor 114.

What is claimed is:

1. In a method of displaying flight guidance information of an own aircraft, wherein a spatial display of air space, comprising at least one horizon and a precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensional illustrated body on the left of the flight path and by at least one three-dimensionally illustrated body on the right of the flight path, which bodies extend longitudinally along the precalculated flight path and wherein the distance of the bodies from each other approximately corresponds to the wing span of a representative aircraft, equivalent to the own aircraft, in the scale of the airspace shown on the display.

2. In a method of displaying flight guidance information of an own aircraft, wherein a spatial display of air space, comprising at least one horizon and a precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensionally illustrated body on the left of the flight path and by at least one three-dimensionally illustrated body on the right of the flight path, which bodies extend longitudinally along the precalculated flight path and wherein an upper edge of the bodies is situated approximately at the eye level of the pilot and a lower edge is situated approximately at the bottom point of the extended landing gear of a representative aircraft, equivalent to the own aircraft, in the scale of the airspace shown on the display.

3. In a method of displaying flight guidance information of an own aircraft, wherein a spatial display of air space, comprising at least one horizon and a precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensionally illustrated body on the left of the flight path and by at least one three-dimensionally illustrated body on the right of the flight path, which bodies extend longitudinally along the precalculated flight path and wherein a further three-dimensionally illustrated body which extends longitudinally along the flight path is displayed above each of the bodies displayed on the left and right of the flight path.

4. In a method of displaying flight guidance information of an own aircraft, wherein a spatial display of air space, comprising at least one horizon and a precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensionally illustrated body on the left of the flight path and by at least one three-dimensionally illustrated body on the right of the flight path, which bodies extend longitudinally along the precalculated flight path; wherein the bodies are subdivided in the longitudinal direction into a plurality of component bodies and wherein the subdivision is visible due to the color of the component bodies.

5. A method according to claim 4, wherein the color of each component body is continuous in the longitudinal direction.

6. A method according to claim 4, wherein at least one color change of at least one component body occurs when the aircraft approaches another object.

7. In a method of displaying flight guidance information of an own aircraft, wherein a spatial display of air space, comprising at least one horizon and a precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensionally illustrated body on the left of the flight path and by at least one three-dimensionally illustrated body on the right of the flight path, which bodies extend longitudinally along the precalculated flight path; wherein the bodies are subdivided in the longitudinal direction into a plurality of component bodies and wherein the position and location of the component bodies are calculated according to the precalculated flight path, and the first component bodies in each case are aligned according to the heading and the following component bodies are aligned according to the course over the ground.

8. In a method of displaying flight guidance information of an own aircraft, wherein a spatial display of air space, comprising at least one horizon and a precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensionally illustrated body on the left of the flight path and by at least one three-dimensionally illustrated body on the right of the flight path, which bodies extend longitudinally along the precalculated flight path and wherein at least one color change of at least one body occurs when the aircraft approaches another object.

9. A method according to claim 8, wherein a further color change occurs when the aircraft has reached another object.

10. A device for displaying flight guidance information of an aircraft, wherein a spatial display of the airspace, comprising at least one horizon and the precalculated flight path of the aircraft, is effected by means of an image reproduction device, and wherein the display of the precalculated flight path comprises the precalculated position and the precalculated attitude of the aircraft at different times, the improvement wherein the display of the precalculated flight path is represented by at least one three-dimensionally illustrated body on the left of the flight path and by at least one three-dimensionally illustrated body on the right of the flight path, which bodies extend longitudinally along the precalculated flight path and wherein a further body, which extends along the flight path, is displayed above each of the bodies which are displayed on the left and right of the flight path.

11. A device according claim 10, wherein the bodies are subdivided in the longitudinal direction into a plurality of component bodies.

* * * * *